US010852466B2

(12) United States Patent
Yeo et al.

(10) Patent No.: US 10,852,466 B2
(45) Date of Patent: Dec. 1, 2020

(54) LIGHTING SUB-ASSEMBLY WITH DUAL MODE OPTICAL ELEMENT

(71) Applicant: Fusion Optix, Inc., Woburn, MA (US)

(72) Inventors: Terence Yeo, Boston, MA (US); Lee Mantha, Lawrence, MA (US); Michael Demas, Charlestown, MA (US); Timothy Kelly, Brookline, MA (US)

(73) Assignee: Fusion Optix, Inc., Woburn, MA (US)

( * ) Notice: Subject to any disclaimer, the term of this patent is extended or adjusted under 35 U.S.C. 154(b) by 61 days.

(21) Appl. No.: 16/039,320

(22) Filed: Jul. 18, 2018

(65) Prior Publication Data

US 2019/0025491 A1 Jan. 24, 2019

Related U.S. Application Data

(60) Provisional application No. 62/534,187, filed on Jul. 18, 2017.

(51) Int. Cl.
*F21V 8/00* (2006.01)
*G02B 6/42* (2006.01)

(52) U.S. Cl.
CPC ............ *G02B 6/002* (2013.01); *G02B 6/005* (2013.01); *G02B 6/0038* (2013.01); *G02B 6/0091* (2013.01); *G02B 6/0055* (2013.01); *G02B 6/0088* (2013.01)

(58) Field of Classification Search
CPC .... G02B 6/002; G02B 6/0066; G02B 6/0046; G02B 6/0045; G02B 6/0013; G02B 6/0021; G02B 6/0038; G02B 6/0091; G02B 6/0088; G02B 6/0055
See application file for complete search history.

(56) References Cited

U.S. PATENT DOCUMENTS

| | | | |
|---|---|---|---|
| 2013/0003412 A1* | 1/2013 | Yagi | G02B 6/0036 362/611 |
| 2016/0334566 A1* | 11/2016 | Qiao | G02B 6/0078 |

* cited by examiner

*Primary Examiner* — Karabi Guharay

(57) ABSTRACT

A lighting subassembly and components are provided which increase light output and uniformity of brightness and color by use of an optical element that functions simultaneously as an outcoupling TIR light guide and a direct throughput lens. It provides typical benefits of an edgelit light guide design including shallow depth, extended emitting area, and off axis light distributions such as batwing distributions particularly useful in downlighting and other lighting applications. Additionally, area dedicated to bezels or edge reflectors can be greatly reduced or eliminated due to decreased hotspotting to provide a fixture face with very high percentage of light emitting area.

23 Claims, 9 Drawing Sheets

LIGHTING SUB-ASSEMBLY WITH DUAL MODE OPTICAL ELEMENT

RELATED APPLICATIONS

Figure 1:
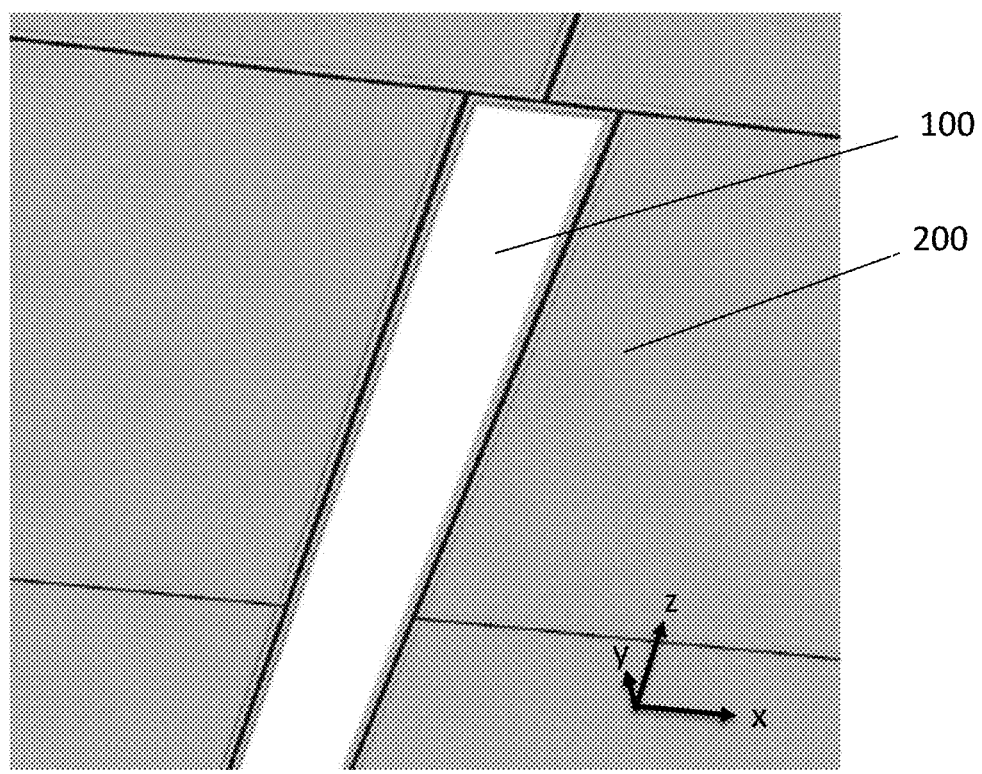

This application claims the benefit of provisional patent application Ser. No. 62/534,187 titled "Lighting Subassembly With Dual Mode Optical Element" filed Jul. 18, 2017.

SUMMARY

A lighting subassembly and components are provided which increase light output and uniformity of brightness and color by use of an optical element that functions simultaneously as an outcoupling TIR light guide and a direct throughput lens. It provides typical benefits of an edgelit light guide design including shallow depth, extended emitting area, and off axis light distributions such as batwing distributions particularly useful in downlighting and other lighting applications. Additionally, area dedicated to bezels or edge reflectors can be greatly reduced or eliminated due to decreased hotspotting to provide a fixture face with very high percentage of light emitting area.

BACKGROUND

Lighting systems incorporating optical waveguides positioned close to the light source provide significant benefits such as thin form factor and adjustable lighting output. However, efficient optical coupling from the light source to the waveguide is difficult to achieve and typically 10% to 30% of light is lost. Traditional approaches that target full edge coupling of light into optical waveguides typically lose efficiency by having low utilization of uncoupled light and of light that enters the input edge but escapes light guide on a non-output face or near the edge where the output is blocked by a bezel or reflector. Often bezels are deemed necessary to hide "hotspotting", non-uniform brightness close to light sources due to excessive outcoupling near the edge. In addition, light sources such as LEDs often have a variation of their color output over angle that is accentuated by coupling into optical light guides.

DESCRIPTION

The accompanying drawings are not intended to be drawn to scale. In the drawings, each identical or nearly identical component that is illustrated in various figures is represented by a like numeral. For purposes of clarity, not every component may be labeled in every drawing.

Embodiment lighting sub-assemblies can be implemented in a wide range of light fixtures. One such fixture that benefits from advantages in aesthetic appearance, light distribution pattern, and luminous efficacy is shown in FIG. 1 The light fixture 100 is mounted flush with ceiling tiles 200 in a ceiling in a downlighting application.

Figure 2:
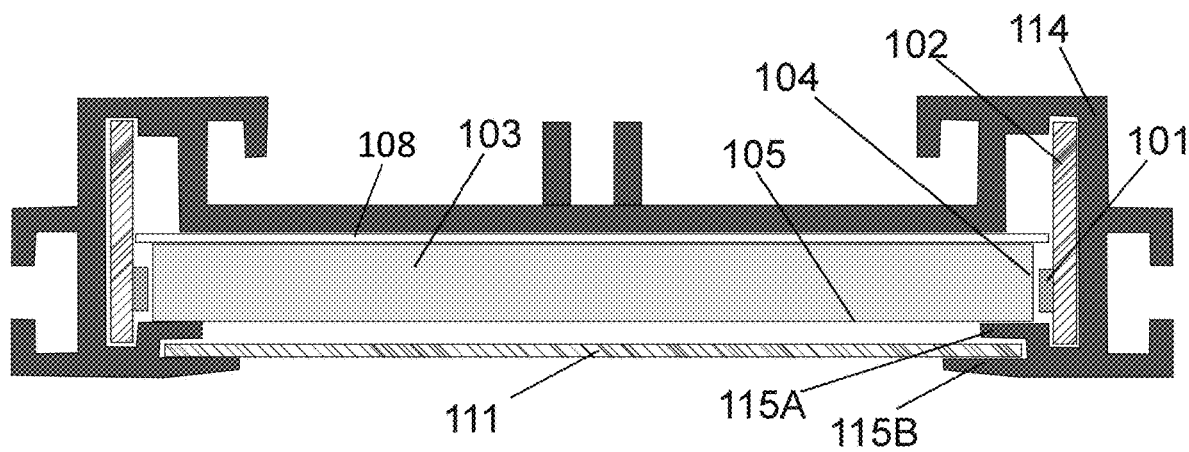

For comparison with the embodiment A of FIG. 3, FIG. 2 shows a cross-section view of a conventional edge lit lighting fixture. The housing 114 holds in place the LED board 102 with LED 101, light guide 103, reflector 108, and cover lens 111. The light guide 103 is a rectangular shaped sheet with an input face 104 and an output face 105 that are adjacent faces oriented at a 90 degree angle. Bezels 115A and 115B cover a significant portion of the ends of the light guide in order to hold the light guide and cover lens in place and also to mask hot spot non-uniformities near the input face of the light guide 103.

Figure 3A:
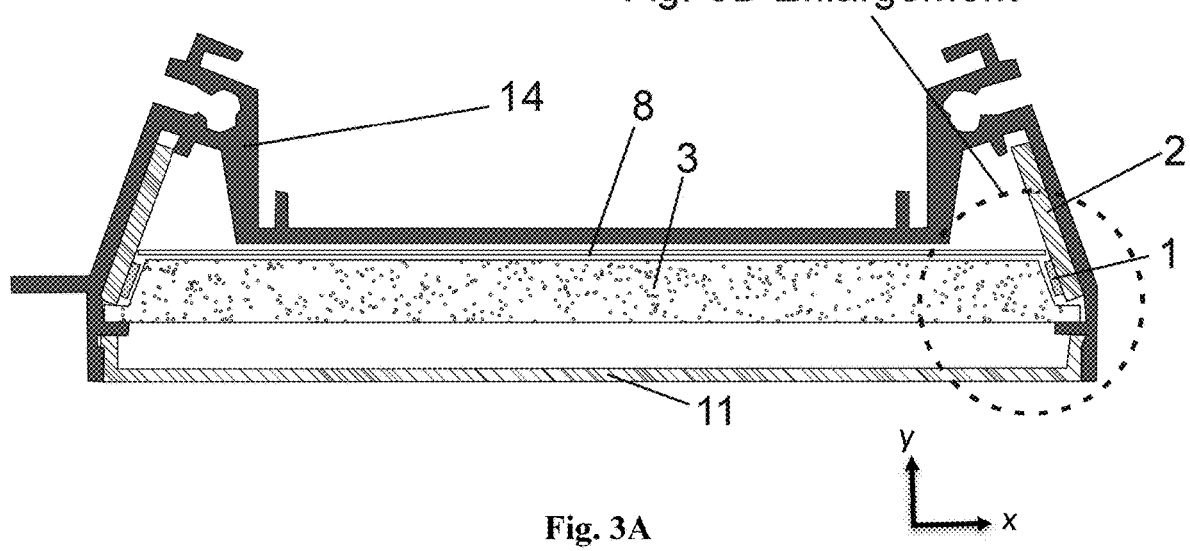
Figure 3B:
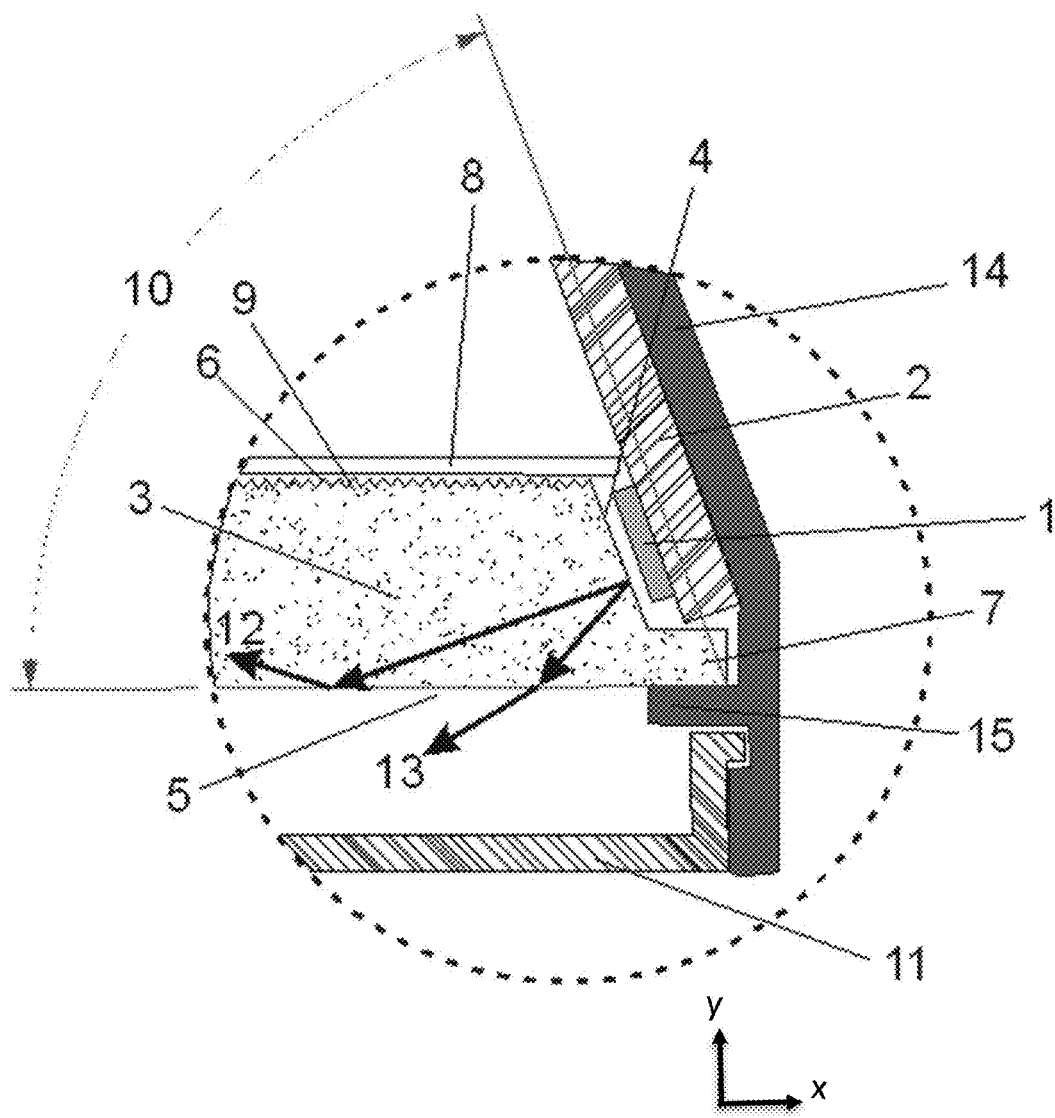

FIG. 3A and FIG. 3B show a cross-section view of embodiment A lighting assembly in which LED 1 light sources are mounted on an LED board 2 which providing a linear light source that inputs light into the optical element input face 4. Light propagates within the optical element 3 and is emitted from the output face 5. A portion of the light propagates directly through the optical element 3 on the direct transmission path 13 while concurrently a portion of the light propagates within the optical element on a TIR path 12 until it outcouples from the optical element 3. Means for outcoupling light are provided by lenticular surface 9 on the optical element opposing face 6 as well as by the light scattering composition of the bulk optical element 3. In embodiment A the light scattering composition is provided by polymer beads dispersed within an acrylic matrix material having a differing refractive index. Light outcoupling out the opposing face 5 is redirected toward the optical element output face 5 by the reflector 8.

The optical element 3 is comprised of a light transmissive material having a refractive index greater than the surrounding ambient environment; in the case of air >1. Optionally, regions of differing refractive index may be dispersed within the volume to scatter light and cause a portion of light to out couple from the optical element. Embodiment A is comprised of PMMA acrylic matrix with PMMA beads of differing refractive index dispersed throughout the volume. Other alternative materials for an optical element include but are not limited to clear or translucent grades of polycarbonate, cyclic olefin copolymers, silicone, and glass. PMMA acrylic has a refractive index of approximately 1.5 which in air produces a total internal reflection (TIR) critical angle of approximately 42 degrees. Dispersed light scattering regions within the optical element can be achieved by dispersing materials of differing refractive index throughout the material. Alternatively, $2^{nd}$ phase regions can be formed in-situ during processing of immiscible material blends.

The housing 14 encloses and holds in place optical components including the optical element 3, LED board 2, and if optionally present, the cover lens 11. The housing contains a bezel 15 feature which functions to cover the edge of the optical element including some or all of the optical element overhang 7.

The optical element input face 4 is inset from the outer perimeter of the optical element output face 5 and is angled so as to form an acute input/output face alignment angle 10, the angle being 70 degrees in the specific case of embodiment A. The acute input/output alignment angle functions to reduce "headlamp" type hot spots from the reflector 8 near the input face 4 and also increases the ratio of direct transmission to TIR light propagating within the optical element. The optical element overhang 7 provides a feature for mechanically securing the optical element in the housing 14 without excessively trapping light behind the bezel 15 as typically occurs in a conventional edge lit construction such as with the bezels 115A and 115B and input face 104 of FIG. 2. This functions to improve overall efficacy (lumens per watt) of the lighting system.

The cover lens 11 is an optional component which can be configured to enclose the output face of the sub-assembly and provide an appearance more uniform in brightness and color. Adjustments to the cover lens 11 surface geometry and bulk light scattering properties can be used to modify the output light distribution from that originating from the optical element output face 5. For example, adjustments to cover lens surface or volumetric light redirecting properties can be used to decrease the wide angle degree of lobes in the light distribution pattern or make brightness or color variations in the beam pattern emitting from the optical element output face more uniform. In the specific case of embodiment A, the surface is congruent with the shape of the cover lens and the bulk of the cover lens material has light scattering properties measured to have a symmetrical full width half maximum value of 68 when measured as a separate component on measurement equipment using as an input light source a narrow beam laser normal to the input surface.

Figure 4:
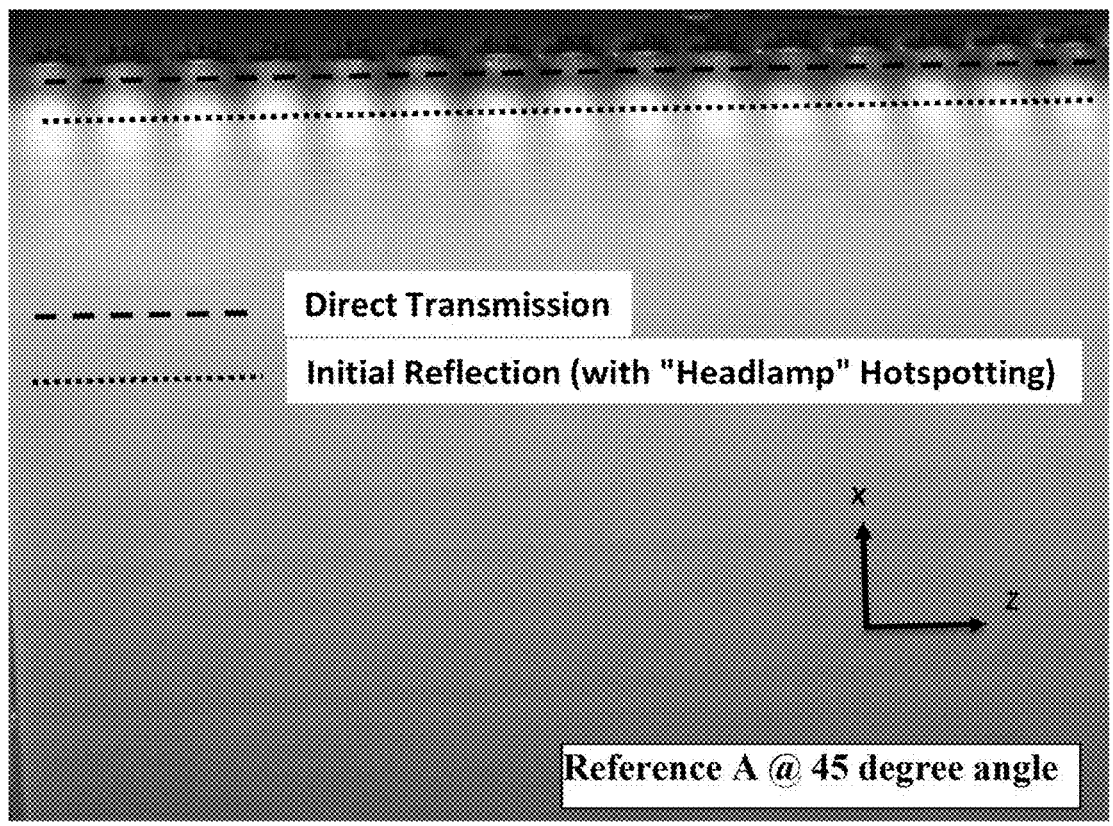
Figure 5:
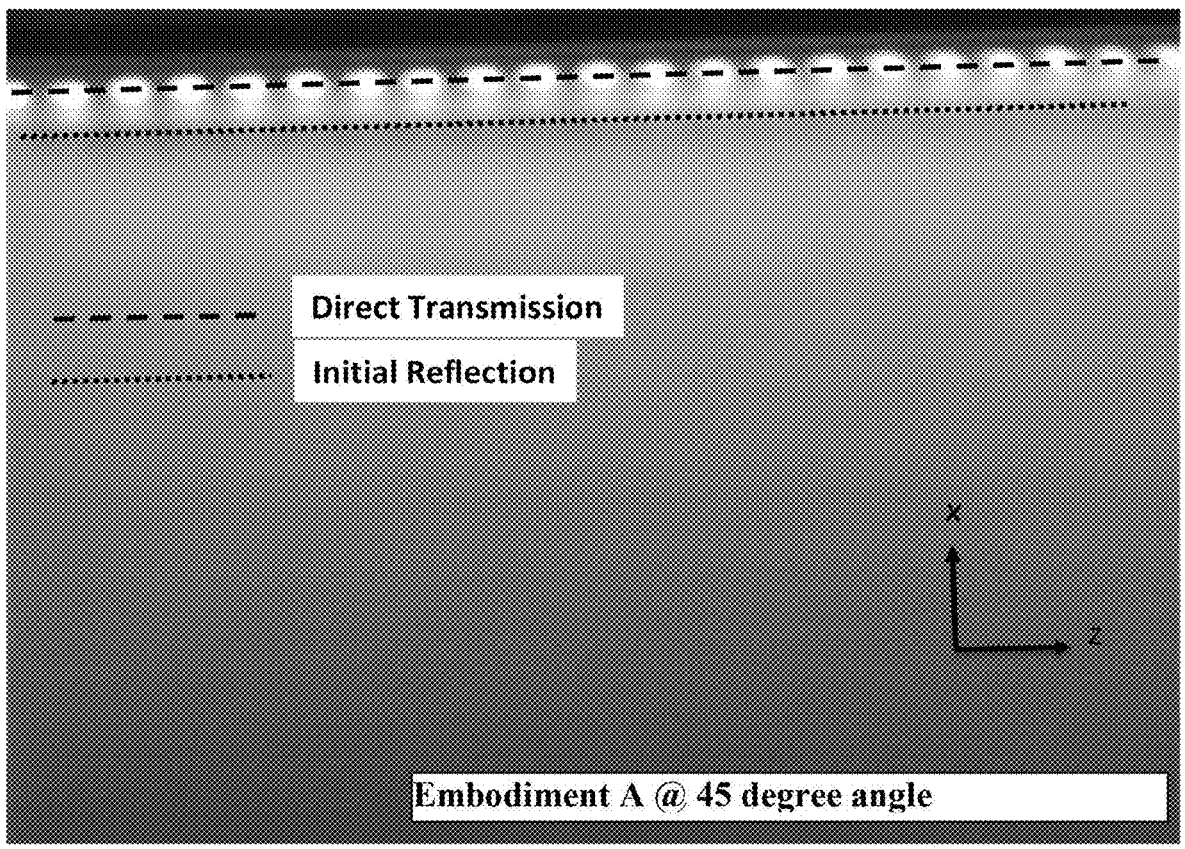

FIG. 4 is a digital image of a Reference A lighting subassembly representing a conventional edgelit light guide construction as shown in FIG. 2 but without a bezel or cover lens. FIG. 5 is a digital image of Embodiment A lighting subassembly shown in FIG. 3A and FIG. 3B but without a bezel or cover lens. Both images were taken at a 45 degree viewing angle of the output face. Marked on the images are locations where line scans were analyzed to assess brightness levels corresponding to light directly transmitted through the light guide/optical element and light that does an initial reflection from the reflector near the input face. In the case Reference A, the initial reflection produces significant hot spot patterning commonly referred to as "headlamping" due to similarity in appearance of automotive headlamps projecting onto ground in front of a car. The headlamping effect is negligible in the FIG. 5 image of embodiment A.

Figure 6:
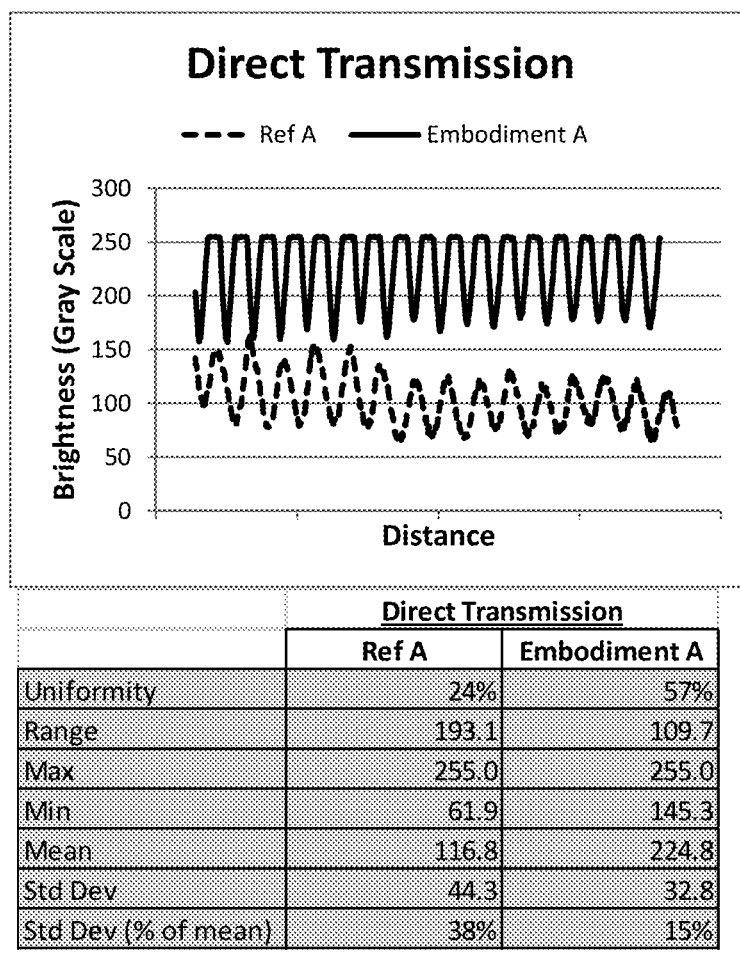
Figure 7:
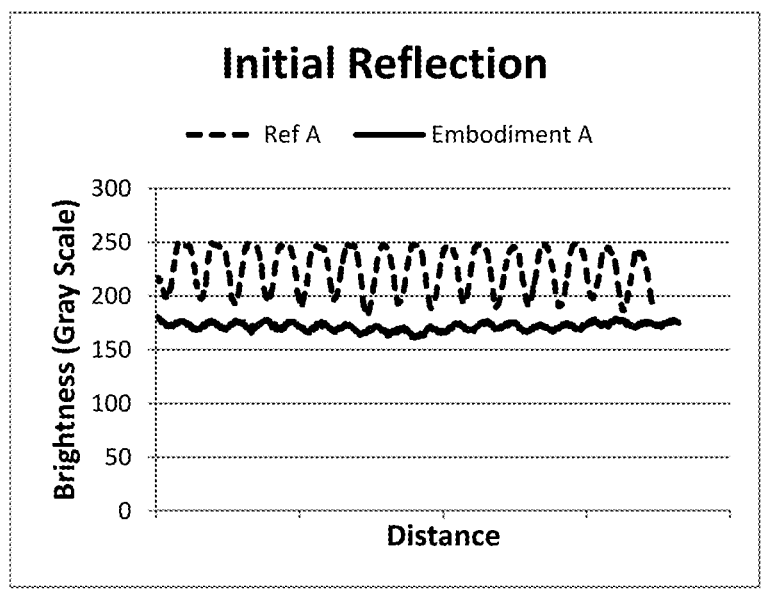

FIG. 6 and FIG. 7 each show graphs and quantitative metrics characterizing brightness values along the line scan paths; FIG. 6 for direct transmission and FIG. 7 for initial reflection. For embodiment A, the direct transmission is significantly greater than reference A. In addition to the data of FIG. 6, this is evidenced by illumination measurements at 45 degrees comparing full optical light guide/optical element output vs. that with the output face masked except for the narrow band of direct transmission zone near the input edge. In this case, embodiment A direct transmission was 28% of full output at 45 degree angle while reference A direct transmission was 12% of total output at 45 degree angle.

Figure 8:
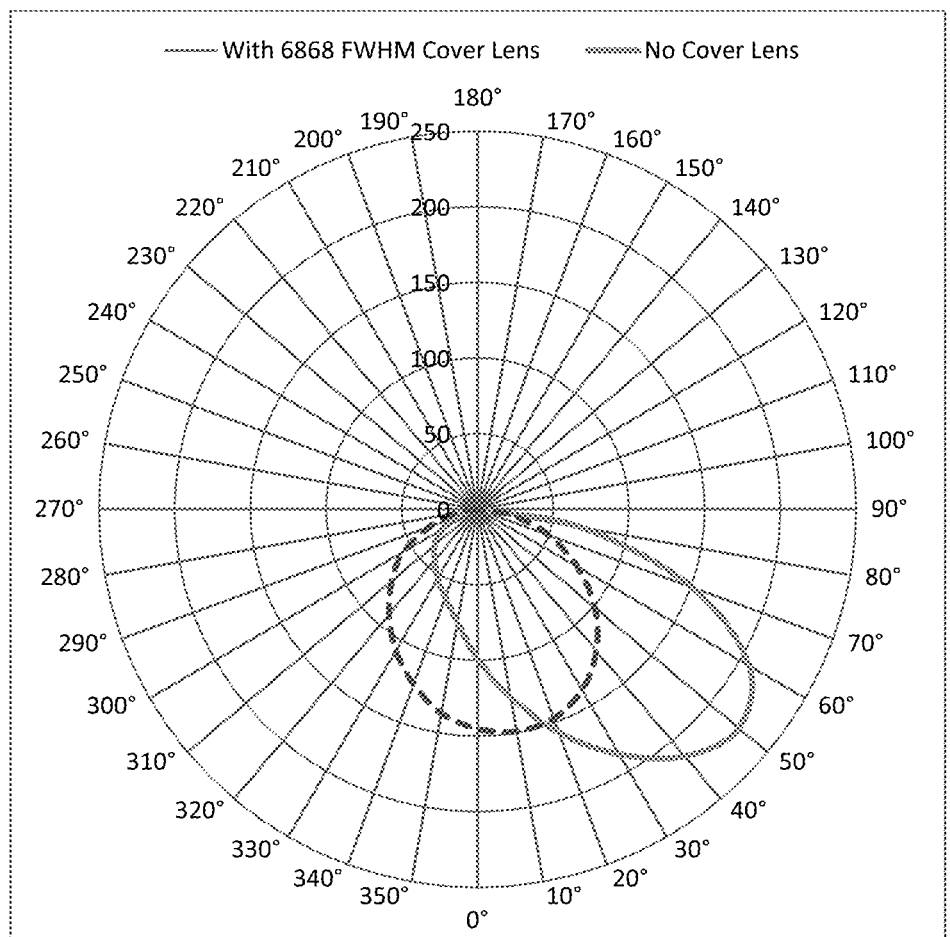

FIG. 8 is a polar plot of embodiment A with one side only LED strip on and the sub-assembly oriented down as in a downlighting fixture. The cover lens is embodiment A is a diffusion lens characterized by a goniometric radiometer as having a symmetric FWHM of 68. This provides a large amount of light scattering that decreases the off axis orientation of light emitted from the optical element output face and produces a light distribution closer to lambertian. The amount of asymmetry in light distribution output can be controlled by selection of amount of light scattering in the cover lens to obtain a range of options between the "no cover lens" and "with cover lens" options illustrated in FIG. 9.

Figure 9:
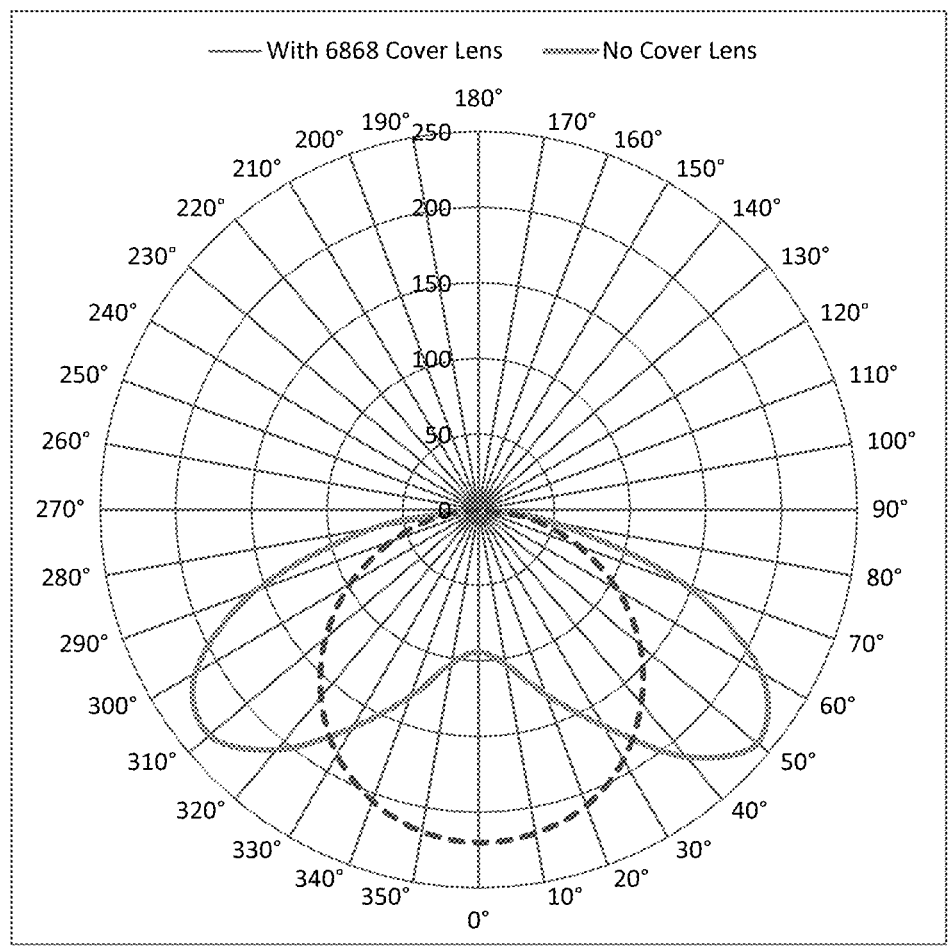

FIG. 9 is polar plot of embodiment A with LED strips on both sides on and the sub-assembly oriented down as in a downlighting fixture and shows a batwing type light distribution which can be adjusted to provide less asymmetry by increasing light scattering in the cover lens. The cover lens in embodiment A has a symmetric FHWM of 6868 which results in a very symmetric light distribution.

LIST OF NUMERICAL REFERENCES

1&101 LED
2&102 LED board
3&103 Optical element
4&104 Optical element input face
5&105 Optical element output face
6&106 Optical element opposing face
7&107 Optical element overhang
8&108 Reflector
9 Lenticular surface
10 Input/output face alignment angle
11&111 Cover Lens
12 TIR Path
13 Direct Transmission Path
14&114 Housing
15&115 Bezel
100 Light Fixture
200 Ceiling Tile

What is claimed is:

1. A lighting sub-assembly comprising;
an optical element having an input face and an output face arranged with an input face/output face alignment angle of less than 90 degrees within a x-y cross-sectional plane aligned with the optical output axis of a light source aligned perpendicular to the z axis of the optical element which emits light into the input face of the optical element;
wherein a portion of light is directly transmitted from the input face through the output face and a portion of light is propagated within the optical element by total internal reflection at the output face.

2. The lighting sub-assembly of claim 1 wherein the optical element is further comprised of an optical element overhang that extends beyond the input face.

3. The lighting sub-assembly of claim 1 wherein the 3 dimensional shape of the optical element is a x-y cross-sectional profile extruded into a z axis.

4. The lighting sub-assembly of claim 1 further comprising a cover lens through which light transmits resulting in a changed lighting distribution after exiting the output face of the light guide.

5. The lighting sub-assembly of claim 4 wherein the 3 dimensional shape of the cover lens is a x-y cross-sectional profile extruded into a z axis.

6. The lighting sub-assembly of claim 1 further comprising a housing that holds the light source and optical element in place so light is input into the optical element input face.

7. The lighting sub-assembly of claim 6 wherein the optical element is connected to the housing by means of the optical element overhang.

8. The lighting sub-assembly of claim 6 wherein the 3 dimensional shape of the housing is a x-y cross-sectional profile extruded into a z axis.

9. The lighting sub-assembly of claim 1 wherein the light source comprises a light emitting diode.

10. The lighting sub-assembly of claim 1 wherein the input face and output face are not adjacent surfaces connected by an intersection.

11. The lighting sub-assembly of claim 1 wherein the optical element is further comprised of surface features which redirect light.

12. The lighting module of claim 11 in which surface features comprise a lenticular pattern.

13. The lighting module of claim 12 in which the lenticular pattern contains a specific extruded cross-sectional shape comprising a full or partial geometric form of a polygon, truncated polygon, concave polygon, convex polygon, parabola, ellipse, sphere, or arc.

14. The lighting module of claim 13 in which surface features comprise a full or partial geometric shape of a sphere, paraboloid, ellipsoid, polyhedron, or polyhedron frustum.

15. A lighting module of claim 11 in which surface features are arranged in a pattern.

16. The lighting sub-assembly of claim 1 further comprising an opposing face to the output face which is not an input face.

17. The lighting sub-assembly of claim 1 further comprising a reflector mounted adjacent to an optical element face opposing the output face.

18. The lighting sub-assembly of claim 17 wherein the input face/opposing face alignment angle is more than 90 degrees within a x-y cross-sectional plane aligned with the optical output axis of a light source aligned perpendicular to the z axis of the optical element.

19. The lighting sub-assembly of claim 1 arranged to produce asymmetric or non-lambertian lighting distributions.

20. The lighting sub-assembly of claim 19 wherein the lighting distribution is a tilted narrow beam or a double asymmetric batwing distributions typically used to illuminate a wall, floor, ceiling or other surface.

21. A lighting sub-assembly comprising;
   a) an optical element having an input face perpendicular to a x-y profile cross-section, an output face perpendicular to a x-y profile cross-section, and an optical element overhang which extends beyond the input face;
   b) a light source aligned perpendicular to the z axis of the optical element which emits light into the input face of the light guide;
   wherein a portion of light is directly transmitted from the input face through the output face and a portion of light is propagated within the optical element by total internal reflection at output face.

22. The lighting sub-assembly of claim 21 wherein an input face/opposing face alignment angle is less than 90 degrees within a x-y cross-sectional plane aligned with the optical output axis of a light source aligned perpendicular to the z axis of the optical element.

23. The lighting sub-assembly of claim 21 wherein an input face/opposing face alignment angle is more than 90 degrees within a x-y cross-sectional plane aligned with the optical output axis of a light source aligned perpendicular to the z axis of the optical element.

* * * * *